United States Patent [19]
Park et al.

[11] Patent Number: 5,296,883
[45] Date of Patent: Mar. 22, 1994

[54] LAMP CHANGING SYSTEM IN LCD PROJECTOR

[75] Inventors: Hong C. Park; Hee S. Koo, both of Seoul, Rep. of Korea

[73] Assignee: GoldStar Co. Ltd., Seoul, Rep. of Korea

[21] Appl. No.: 981,394

[22] Filed: Nov. 25, 1992

[30] Foreign Application Priority Data

Nov. 27, 1991 [KR] Rep. of Korea ............... 1991/21442

[51] Int. Cl.⁵ .............................................. G03B 21/00
[52] U.S. Cl. ........................................ 353/87; 359/48; 362/254
[58] Field of Search ........................... 353/87, 85, 119; 359/94, 48; 362/20, 254

[56] References Cited

U.S. PATENT DOCUMENTS

| | | | |
|---|---|---|---|
| 3,314,331 | 4/1967 | Wiley | 353/87 |
| 3,529,147 | 9/1970 | Badalich | 362/254 |
| 4,415,951 | 11/1983 | Recane et al. | 362/20 |
| 5,032,962 | 7/1991 | Gehly et al. | 362/254 |

*Primary Examiner*—William A. Cuchlinski, Jr.
*Assistant Examiner*—William C. Dowling

[57] ABSTRACT

A lamp changing system is an LCD projector, comprising a reflective facet, a rotary plate having a plurality of arc-tubes and blocks disposed thereon, and a cam member having an upper cam and a lower cam, whereby upon rotating the cam member, an old arc-tube is separated from and new arc-tube is replaced for the old arc-tube as a light source for the LCD projector.

11 Claims, 8 Drawing Sheets

LAMP CHANGING SYSTEM IN LCD PROJECTOR

BACKGROUND OF THE INVENTION

1. Field of the Invention

The present invention relates to a lamp changing system in a liquid crystal display (hereinafter "LCD") projector and more particularly, to a replaceable arc-tube as a light source with a reflective facet attached to a lamp in a front projection type LCD projector

2. Description of the Related Art

Figure 1:
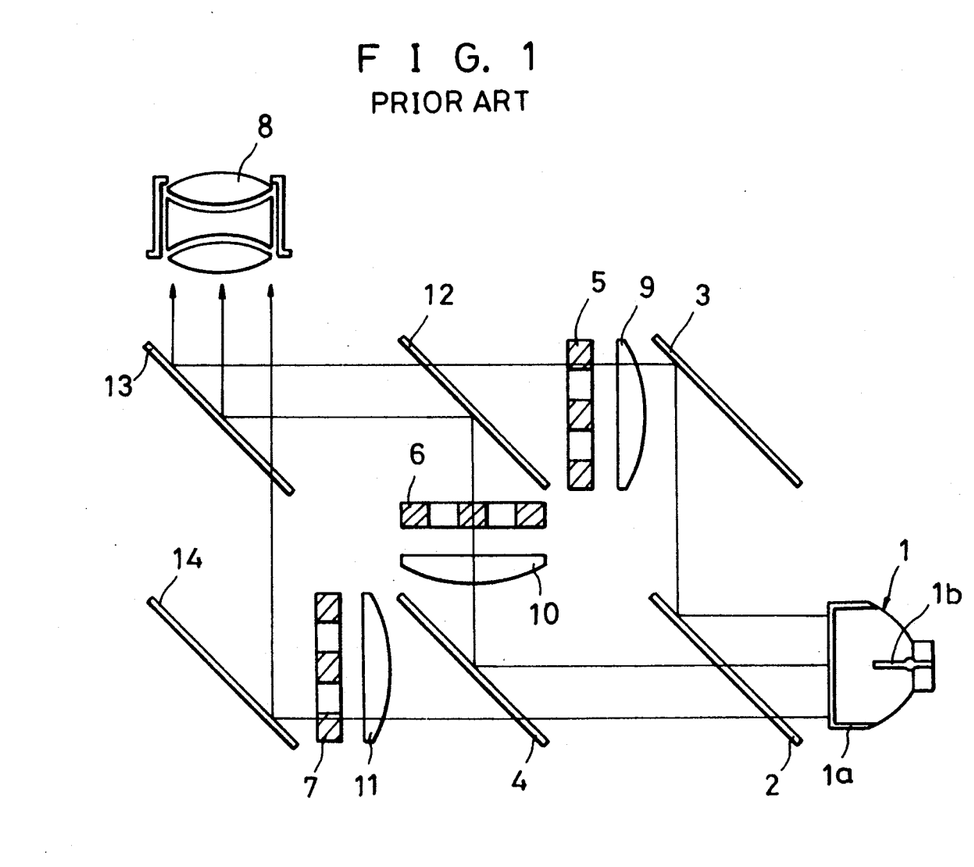
FIG. 1 is an explanatory view illustrating the operation of a conventional front projection LCD projector.

Various types of front projection LCD projectors are known in the art. For example, as shown in FIGS. 1 and 2, one such front projection LCD projector, includes first dichroic mirrors 2, 3 and 4 for separating red, green and blue from white light illuminated from a lamp 1, LCDs 5, 6 and 7 for displaying respective image signals of the colors, and condenser lenses 9, 10 and 11 disposed on the light source side of the LCDs 5, 6 and 7. The front projection LCD further includes second dichroic mirrors 12, 13 and 14 for synthesizing the three colors from the LCDs 5, 6 and 7, and a projection lens 8 for projecting the displayed images from the LCDs 5, 6 and 7 onto a screen. As can be seen in FIG. 1, the first dichroic mirrors 2, 3 and 4 are color separation devices and the second dichroic mirrors 12, 13 and 14 are color synthesis devices.

Figure 2A:
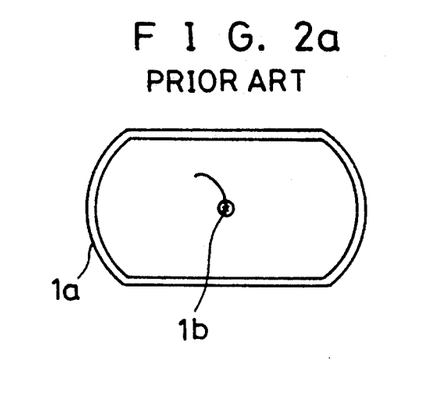
FIG. 2A is a front elevational view of a lamp assembly of the conventional front projection LCD projector.
Figure 2B:
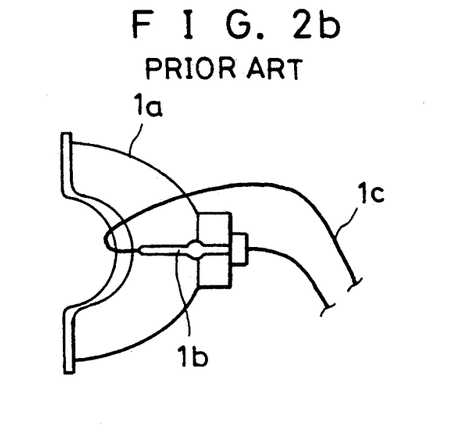
FIG. 2B is a plan view of the lamp assembly of the conventional front projection LCD projector.
Figure 2C:
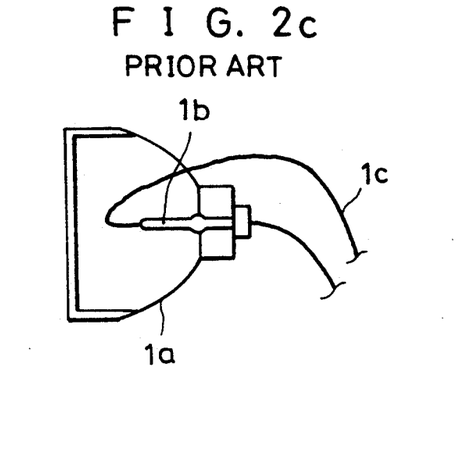
FIG. 2C is a side elevational view of the lamp assembly of the conventional front projection LCD projector.

As shown in FIGS. 2A-2C, the lamp 1 as a light source includes reflective facet 1a, an arc-tube 1b as a luminous body, and an electric wire 1c for supplying an electric source. The lamp 1 has a useful life of several thousands hours and its lifetime depends on the arc-tube 1b. Therefore, the lamp 1 has to be replaced when the arc-tube 1b burns out. Further, it is expensive to replace the high priced reflective facet 1a in the lamp 1 and it is difficult to handle the reflective facet 1a manually.

SUMMARY OF THE INVENTION

Accordingly, it is an object of the present invention to provide a lamp changing system in a liquid crystal display, which eliminates the above problems.

Another object of the present invention is to provide a lamp as the light source of the LCD projector, the lamp comprising a replaceable arc-tube and a reflective facet, the replaceable arc-tube being provided as a plurality of arc-tubes disposed on a rotary plate at equal angle spaces from each other, whereby when one of the plurality of arc-tubes burns out, the arc-tube automatically separates from the reflective facet by operation of a cam member and a replacement or new arc-tube can be substituted by rotation of the rotary plate and the new arc-tube is connected to the electric source.

A further object of the present invention is to provide a replaceable arc-tube in an LCD projector, which comprises a cam member including an upper cam for pushing an arc-tube through an opening in the reflective facet and a lower cam for rotating a rotary plate on which a plurality of arc-tubes are provided wherein the upper cam has a ring configuration and the lower cam has a panel configuration.

Other objects and further scope of applicability of the present invention will become apparent from the detailed description given hereinafter. It should be understood, however, that the detailed description and specific examples, while indicating preferred embodiments of the invention, are given by way of illustration only, since various changes and modification within the spirit and scope of the invention will become apparent to those skilled in the art from this detailed description.

Briefly described, the present invention relates to a lamp system in an LCD projector, which lamp system comprises a reflective facet, a rotary plate having a plurality of arc-tubes and blocks disposed thereon for changing a burnt out arc-tube, and a cam member having an upper cam and a lower cam, whereby upon rotating the cam member, an old arc-tube is separated from the lamp and a new arc-tube is replaced for the old arc-tube as the light source for the LCD projector.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Referring now in detail to the drawings for the purpose of illustrating preferred embodiments of the present invention, the lamp changing system in the LCD projector as shown in FIGS. 3, 4, and 5A-5C, comprises a lamp as a light source, including a reflective facet 20 fixed to a bracket 36 and a plurality of arc-tubes 21 attached to a rear side of the reflective facet 20.

Each arc-tube 21 includes a ring support 22 at the base of the tube extending therefrom and a pair of electrode terminals 23a and 23b attached to the arc-tube 21. The reflective facet 20 is attached to a bracket 36 supported on a main body and is provided with a rotary plate 24 disposed at the rear side thereof. The plurality of arc-tubes 21 are disposed at equal angles, for example, 90° in FIG. 5A.

Figure 3:
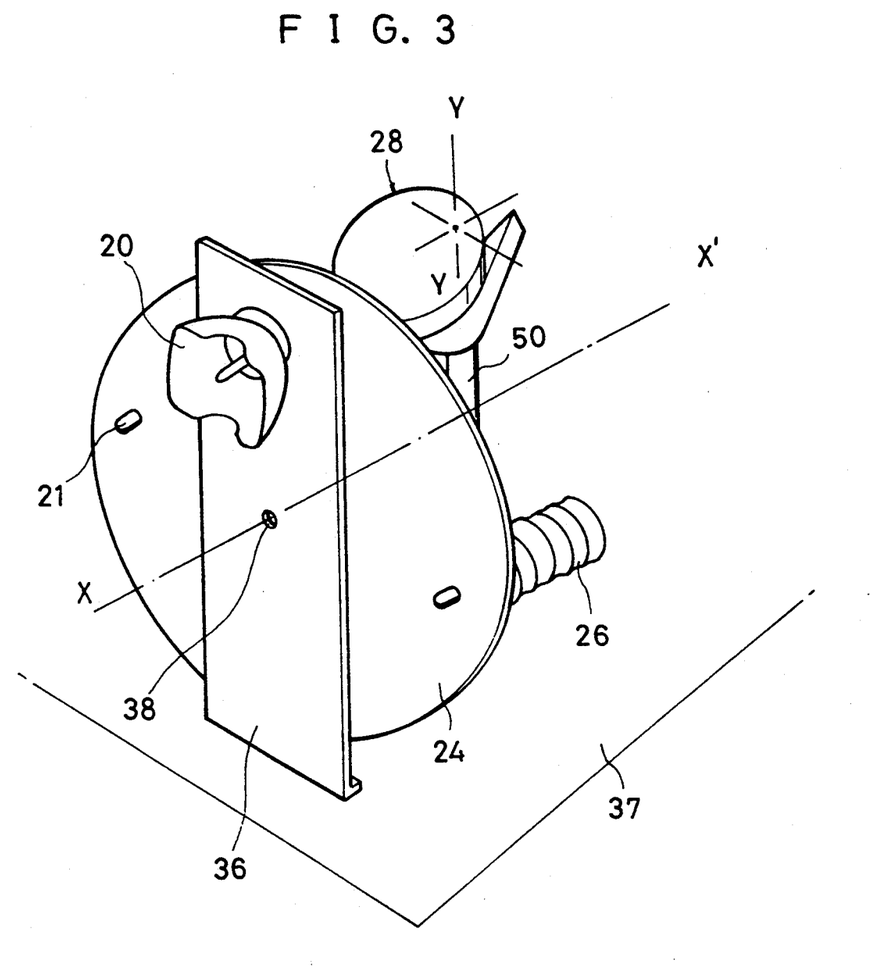
FIG. 3 is a front side perspective view of the projector according to the present invention.
Figure 4:
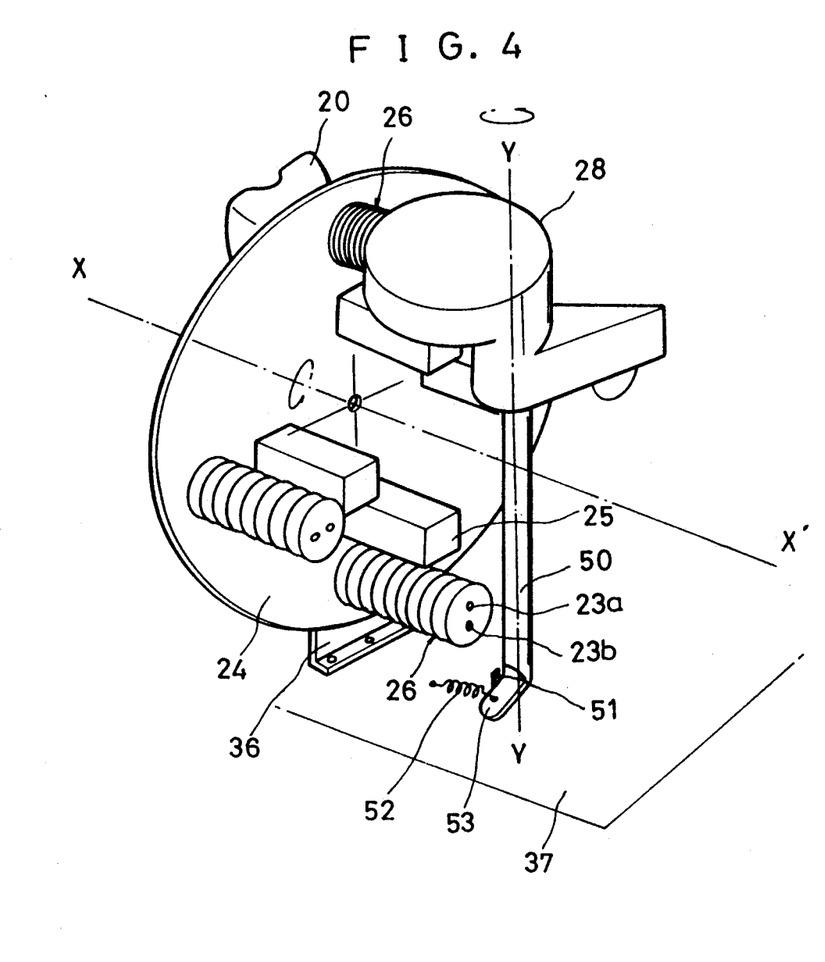
FIG. 4 is a rear side perspective view of the projector according to the present invention.
Figure 5A:
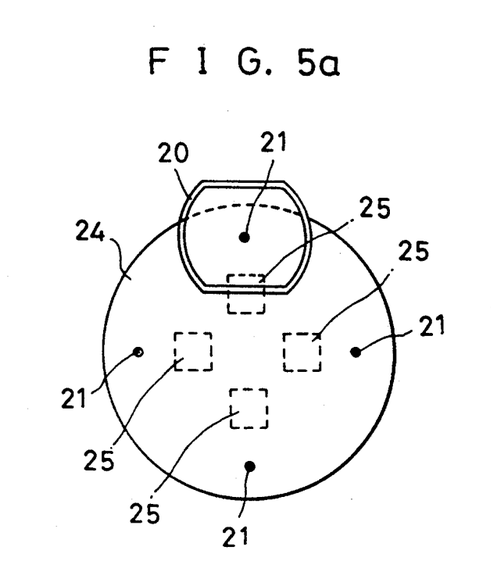
FIG. 5A is a front elevational view of the lamp changing device of the present invention.
Figure 5B:
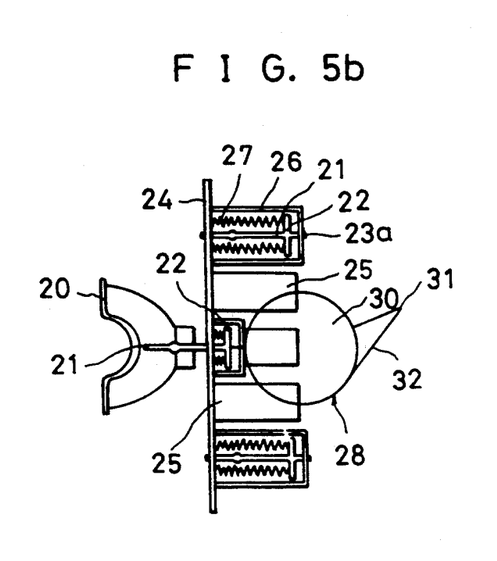
FIG. 5B is a plan view of the lamp changing device of the present invention.
Figure 5C:
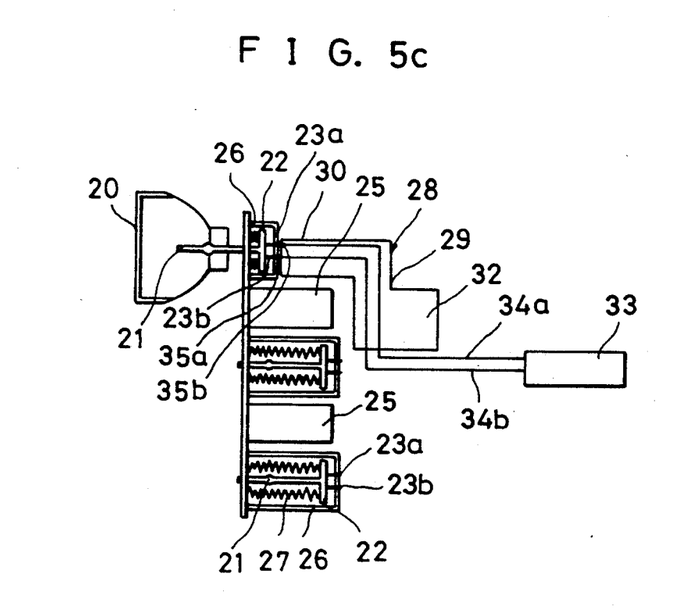
FIG. 5C is a side elevational view of the lamp changing device of the present invention.
Figure 6A:
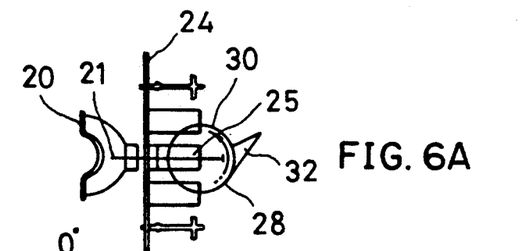
FIGS. 6A to 6R illustrate the operation of the lamp changing device of the present invention.
Figure 6B:
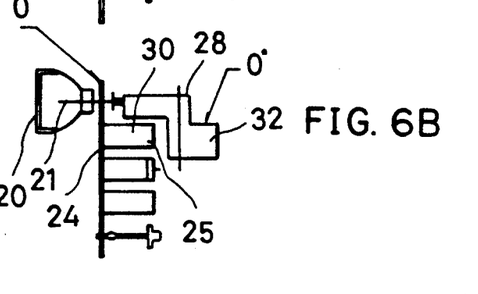
Figure 6C:
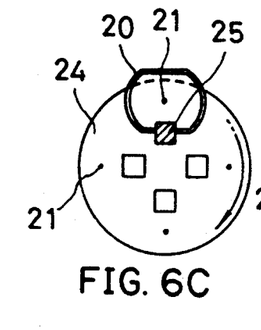
Figures 6D, 6E, 6F:
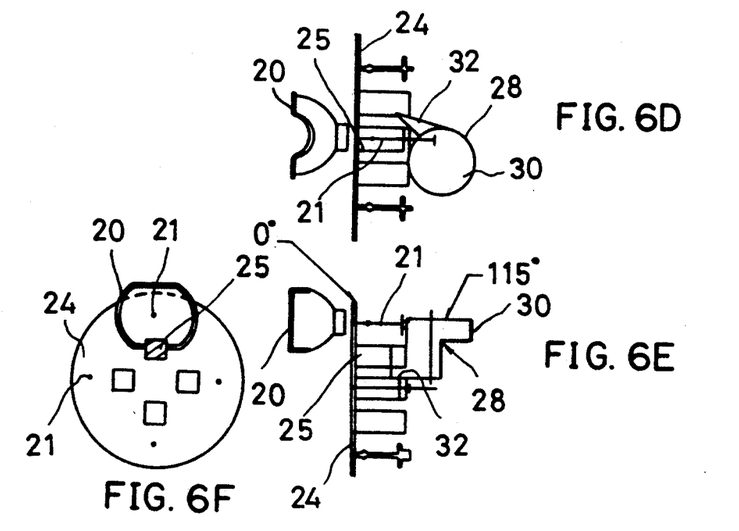
Figure 6G:
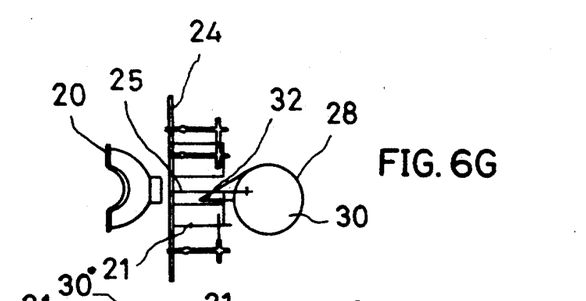
Figures 6H, 6I:
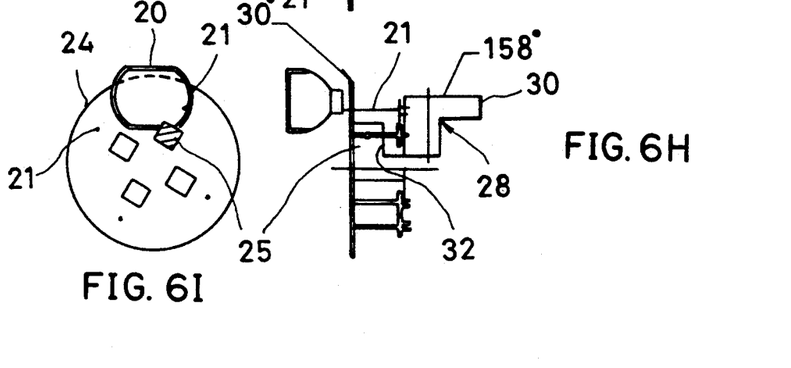
Figures 6J, 6K, 6L:
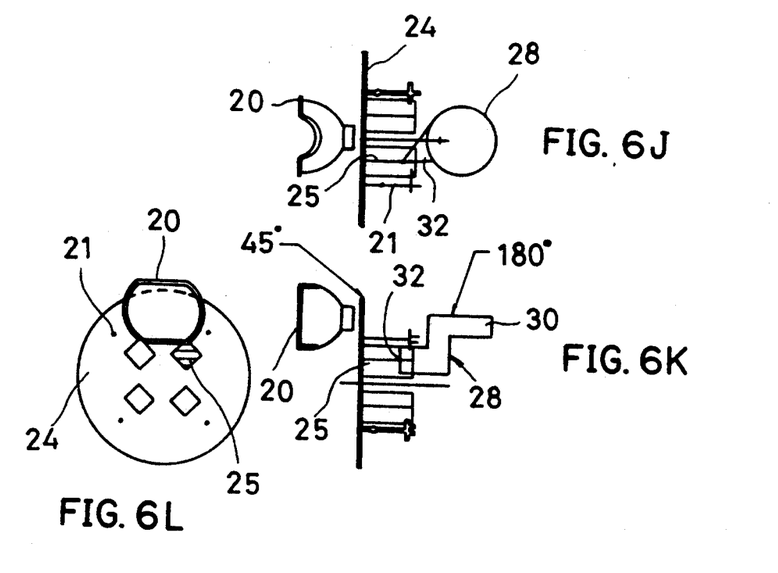
Figure 6M:
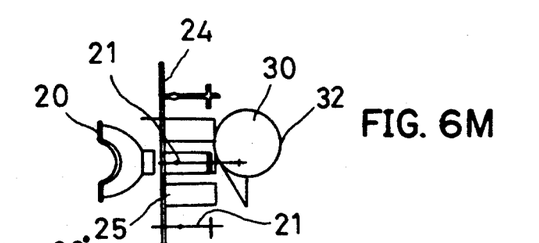
Figure 6N:
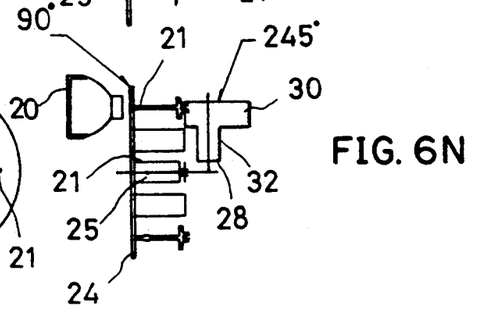
Figure 6O:
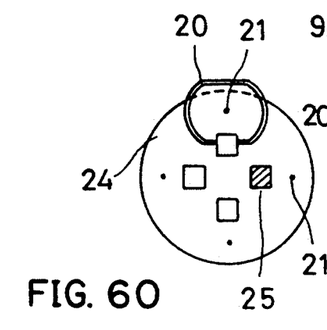
Figures 6P, 6Q, 6R:
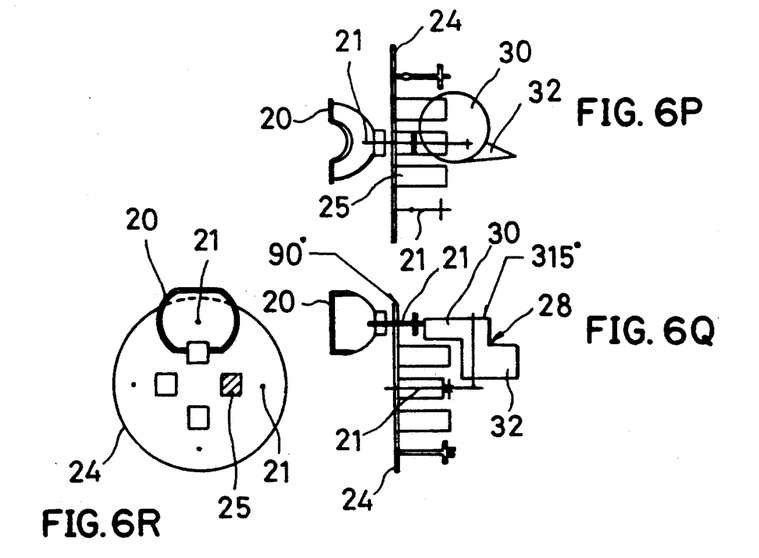

The plurality of arc-tubes 21 on the rotary plate 24 are located on a circumference of a circle and a plurality of blocks 25, for example, as shown in FIGS. 3 and 5A, are located on a another circumference of a circle which is disposed within the circle circumference of the plurality of arc-tubes 21. The center of both circles are collocated and lie on axis x-x'.

Each arc-tube 21 placed on the rotary plate 24 extends from the rear side thereof and the exterior of the arc-tube 21 is covered with an elastic tube 26. A spring 27 is inserted into a space disposed between the rear side of the rotary plate 24 and the ring support 22 of the arc-tube 21 for biasing the arc-tube 21 to the rear side of the elastic tube 26. A pair of electrode terminals 23a and 23b are on the rear portion of the elastic tube 26.

A cam member 28 has a cam shaft 29 which extends to a vertical shaft 50. The cam shaft 29 receives a rotating force from a rotating device (not shown) and is provided with an upper cam 30 eccentrically attached to the upper portion and a lower cam 32 attached to the lower portion thereof. The lower cam 32 has a top point 31 located at an area which is symmetrically disposed at a top point of the upper cam 30. An electric source 33 is connected to a pair of electrodes 35a and 35b disposed at the top point of the upper cam 30 by electric wires 34a and 34b (shown in FIG. 5C) and passes through the interior of the cam shaft 29 and upper cam 30.

The lamp changing device in the front projection LCD projector according to the present invention operates as follows. When an arc-tube 21 is connected to the reflective facet 20, the rear end of the elastic-tube 26 is contacted with the top point of the cam member 28, which is a far point of the cam from the cam shaft 29 of the cam member 28. Therefore, the arc-tube 21 is advanced to the front side from the rear side of the rotary plate 24 and is associated with the reflective facet 20. At this time, the pair of electrode terminals 23a and 23b of the pair of electrodes 35a and 35b disposed on the upper cam 30 of the cam member 28, respectively, are connected to the electric source 33, so that the arc-tube 21 functions as a light source for the projection LCD projector according to the present invention. Also, at this time, the spring 27 disposed in the rear portion of the arc-tube 21 is compressed within the electric tube 26.

When the arc-tube 21 has been used for its operational life time, a new arc-tube 21 is replaced for the old one by rotating the rotary plate 24. That is, a new arc-tube 21 is associated with the reflective facet 20. In addition, as shown in FIGS. 6a–6f, the cam member 28 rotates in the counter-clockwise direction. Therefore, the upper cam 30 rotates around the cam shaft 29 eccentrically and the rear end of the arc-tube 21 is moved to the cam shaft 29 by the spring 27. Accordingly, the old arc-tube 21 starts to separate from the reflective facet 20.

When the upper cam 30 rotates about 180°, the top point 31 of the lower cam 32 pushes the block 25, which is located at an inner portion of the arc-tube 21 to be separated. Therefore, the rotary plate 24 rotates in the clockwise direction, and the old arc-tube 21 is far from and the new arc-tube 21 is near to the reflective facet 20. Thereafter, the new arc-tube 21 is located at the rear side of the reflective facet 20. At this time, the elastic tube 26 is pressed by the upper cam 30 through the spring 27 and the new arc-tube 21 is completely inserted into the reflective facet 20. Also, since the lower cam 32 is removed from the block 25, the rotary plate 24 does not rotate.

Accordingly, the present invention relates to a replaceable lamp member attached to the projection LCD projector. The old arc-tube 21 is separated from the reflective facet 20 and the new arc-tube 21 is replaced for the old arc-tube 21. Accordingly, it is convenient and economic to supply the light source for the projection LCD projector.

The invention being thus described, it will be obvious that the same may be varied in many ways. Such variations are not to be regarded as a departure from the spirit and scope of the invention, and all such modification as would be obvious to one skilled in the art are intended to be included in the scope of the following claims.

What is claimed is:

1. A lamp changing system in a liquid crystal display projector comprising:
   a reflective facet,
   a rotary plate disposed at the rear side of said reflective facet, said rotary plate including:
   a plurality of arc-tubes biased by a spring disposed within an elastic tube box, and
   a plurality of blocks disposed closer to a center of said rotary plate than said plurality of arc-tubes,
   an upper cam for supplying an electric source by moving one of said plurality of arc-tubes toward said reflective facet, and
   a lower cam for moving one of said plurality of blocks so as to rotate said rotary plate, whereby when the one of the plurality of arc-tubes has been used for its useful life, the one of the plurality of arc-tubes is separated from the electrode source and another of said plurality of arc-tubes is replaced a light source for the liquid crystal display projector.

2. The lamp changing system of claim 1, wherein a number of said plurality of arc-tubes and said plurality of blocks is equal.

3. The lamp changing system of claim 2, wherein the number of said plurality of arc-tubes and said plurality of blocks is two.

4. The lamp changing system of claim 2, wherein the number of said plurality of arc-tubes and said plurality of blocks is four.

5. A lamp changing system in a liquid crystal display projector comprising:
   a reflective facet;
   means for rotating a rotary plate having a plurality of arc-tubes;
   means for inserting one of the plurality of arc-tubes into said reflective facet;
   means for supplying power to said inserted arc-tube; and
   means for separating said inserted arc-tube from said reflective facet.

6. The lamp changing system of claim 5, said arc-tube inserting and separating means including a elastic tube box having a cylindrical shape which is compressed toward said reflective facet, and fixed at one part to said rotary plate disposed at a rear side of said reflective facet, and
   an upper cam member abutted on the rear side of said elastic tube box and eccentrically rotated on its own rotating axis perpendicular to a rotation axis of said rotary plate.

7. The lamp changing system of claim 6, said elastic tube box comprising:
   said inserted arc-tube;
   a ring support formed at the rear side of said inserted arc-tube;
   a spring inserted between said ring support and said rotary plate for moving said inserted arc-tube away from said rotary plate;
   an elastic tube for encompassing said arc-tube, said ring support, and said spring; and
   first electrode terminals formed at a rear side of said ring support.

8. The lamp changing system of claim 6, said rotary plate rotating means comprising:
- a plurality of blocks fixed at a rear side of said rotary plate; and
- a lower cam member uniformly formed with said upper cam member of said arc-tube inserting and separating means, positioned at a rear side of said plurality of blocks, wherein when said lower cam member rotates, said lower cam member engages one of said plurality of blocks and rotates said rotary plate.

9. The lamp changing system of claim 7, said power supplying means comprising second electrode terminals formed at the upper cam member for connecting with said first electrode terminals of said inserted arc-tube, and a power source connected to said second electrode terminals.

10. The lamp changing system of claim 8, said upper cam member and lower cam member have a uniform structure allowing said lower cam member to contact with the one of said plurality of blocks after said inserted arc-tube is entirely separated from said reflective facet according to a rotation of said upper cam member.

11. The lamp changing system of claim 8, wherein a number of said plurality of arc-tubes is equal to a number of said plurality of blocks.

* * * * *